Figure 1:
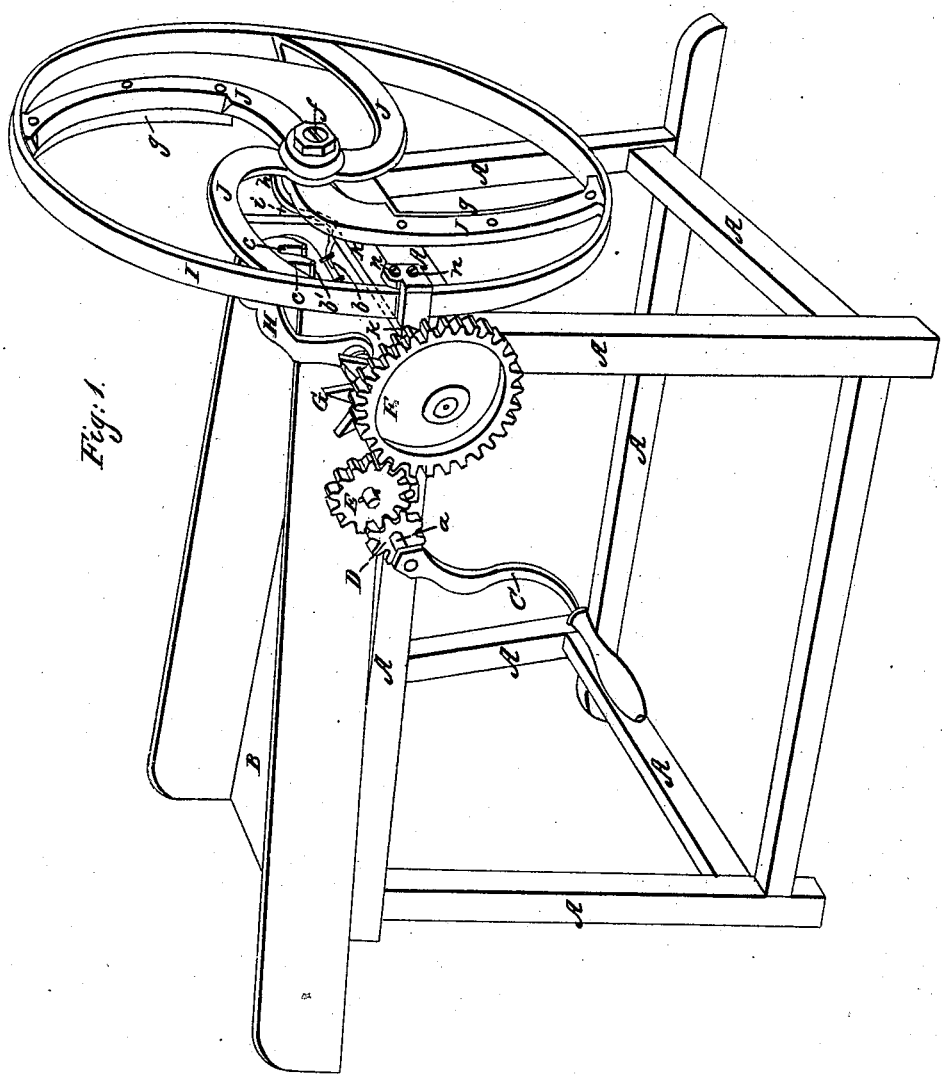

J. A. PITTS.
Straw Cutter.

No. 12,254.

2 Sheets—Sheet 1.

Patented Jan. 16, 1855.

J. A. PITTS.
Straw Cutter.
No. 12,254.
2 Sheets—Sheet 2.
Patented Jan. 16, 1855.
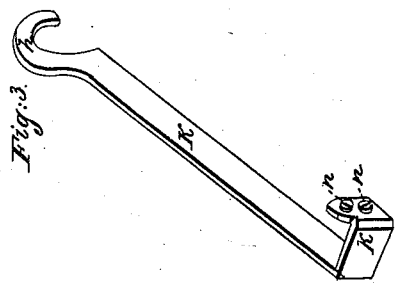
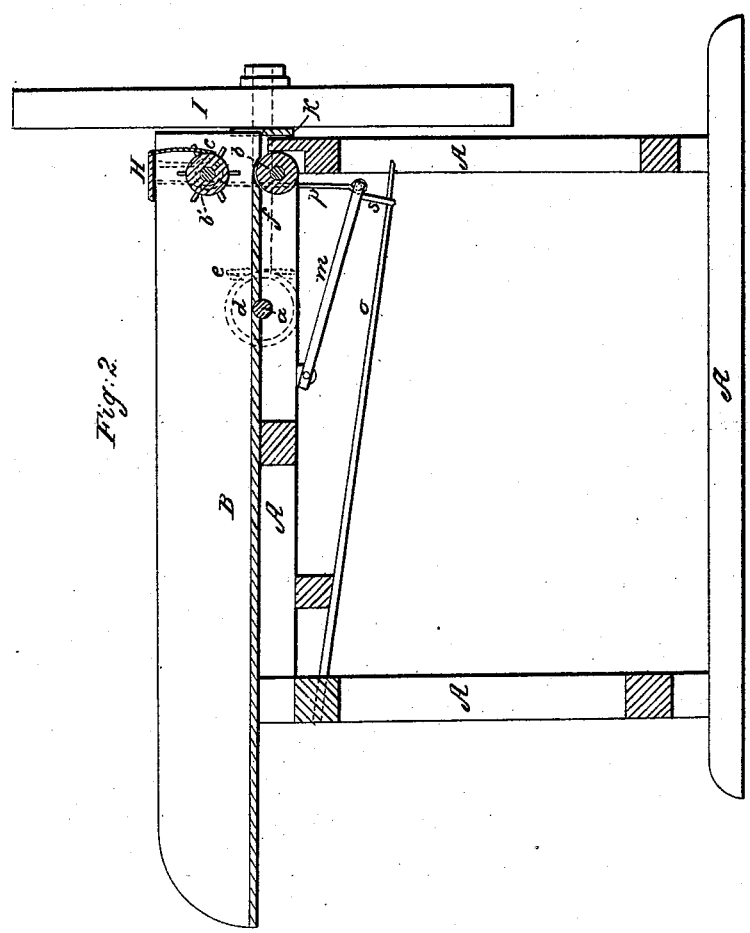

UNITED STATES PATENT OFFICE.

JOHN A. PITTS, OF BUFFALO, NEW YORK.

STRAW-CUTTER.

Specification of Letters Patent No. 12,254, dated January 16, 1855.

*To all whom it may concern:*

Be it known that I, JOHN A. PITTS, of Buffalo, in the county of Erie and State of New York, have invented certain new and useful Improvements in Straw-Cutters; and I do hereby declare the following to be a full, clear, and exact description of the same, reference being had to the accompanying drawings, making a part thereof, in which,—

Figure 1, represents a perspective view, Fig. 2, represents a longitudinal vertical section through the same, and Fig. 3, represents a detached portion thereof.

Similar letters where they occur denote like parts.

In straw cutters of the class herein represented, an adjustment of the throat or bar, against which the knives cut shear fashion, may be made, but as the knives become dull, their tendency is to move away from the material to be cut. This readily occurs because both the shaft and wheel may play and spring a little, and any yielding at the hub of the wheel is increased in a very considerable ratio at the periphery. Another difficulty in this universally used implement is, that toothed rollers (at least one such) must be used to feed up the straw to the knives, as entirely smooth feed rolls will not effectually do it. But in using toothed rolls, the straw or other material being cut, will " wind " or clog on the rolls.

The nature of my invention consists in so combining the bar against which the knives cut, with the cutting wheel, as that it shall always maintain its relative or fixed position to said knives, whether they be more or less dull, or whether the wheel have any spring or play from its hub or shaft.

To enable others skilled in the art to make and use my invention, I will proceed to describe the same with reference to the drawings.

The distinguishing feature of my invention might be said to exist in the fact that the cutter or throat bar, instead of being a part of the straw box, and adjustable thereon, is a part of the cutter wheel, and made adjustable to and on said wheel although it is stationary, and the wheel revolves in the usual way.

A, represents the frame of the straw cutter and B, the straw box, which may be made in any of the usual well known substantial ways.

C, is a crank on a shaft $a$, and on said shaft is also arranged a spur wheel D, meshing with a pinion E, which in turn drives a gear wheel F. On the shaft of this gear wheel F, is a star gear wheel (not seen) which works into a similar star wheel G immediately over it. The two feeding rolls $b$, $b'$, receive their motion through this star gearing, which admits of the top one $b'$ rising to accommodate itself to the feed—it being held down on the straw by a spring underneath the straw box as will be hereafter described. The top roll $b'$, is provided with teeth to catch, hold, and draw forward the straw to the knives—the lower one $b$, may be plain, or may be arranged like its fellow. On the journals of the upper roll is supported the bent down ends of a bar H, which has curved teeth $c$, $c$, on it projecting forward of said roll, the points of said teeth being in close proximity to the roll, and so arranged as to allow the teeth on the roll, to pass between them. As the motion of the top roll is against the teeth of the scraper or comb H, they remove everything which tends to wind or clog on said roll. As this comb is arranged on the journals or shaft of the top roll, it of course rises and falls with said roll, and always preserves its fixed position thereto.

The shaft $a$, before described passes across the frame under the straw box, and has upon its further end a bevel gear wheel $d$ (in dotted lines in Fig. 2,) which meshes with another bevel gear wheel $e$, at right angles thereto, which is arranged on a shaft $f$, parallel to the straw box, and extending to the front of said straw box where it receives the cutter wheel I. This cutter wheel I, is provided with curved arms J, upon two (or more) of which the blades or knives $g$, are placed, also curved so as to give a draw cut in the usual form.

K, is the throat or bar against the side of which the knives $g$, cut shear fashion. This bar is seen detached in Fig. 3, and in its place in the other figures. It has one end $h$, curved so as to fit over the shaft $f$, and is placed between the hub of the wheel I, and a collar $i$, on said shaft to keep it from traversing on said shaft. The upper edge of the bar, is just on a line with the lower edge of the straw box, so that the material may readily pass over the top of the bar. The end of the bar ($k$) extends to the periphery of the wheel, and is so bent around as to clasp the rim of the wheel. Set screw $n$, $n$ in the bent end of the bar, brings it up against the rim, just hard enough to allow the rim to freely pass, and yet prevent the bar from leaving the wheel or vice versa. If found desirable, friction rollers may be placed at the point of contact between the rim bar. It is obvious by inspection of the drawings that, the bar must always maintain its position with regard to the knives, and however much they may tend to pass the straw or other material, by so doing, they carry the bar with them, and it is always in the proper place to meet the knives as they come around.

It is found in practice, to test the utility of this invention, that even wood can be cut through, as the knives always have their supporting bar in proper place and cannot by any possibility pass it without cutting.

In order that both ends of the upper roller may rise and fall with uniformity, I use an intermediate hinged board $m$, Fig. 2, between said rolls, and the spring $o$ which holds it down upon the straw in the box. The journals of the roll $b'$, are connected to the hinged board $m$, by the stirrup straps $p$, and the board is connected to the spring by a strap $s$. The width of the board $m$, is about equal to the length of the roll, as it (the board) rises and falls equally at both sides, and thus equally controls the rising and falling of the roll. The spring $o$, is placed about midway of the width of the board $m$.

Having thus fully described the nature of my invention what I claim therein as new and desire to secure by Letters Patent, is—

So combining the cutting wheel and bar as that the edges of the cutters must always pass the bar at a fixed adjustable distance, whether the tendency to force the cutters from the straw be great or not.

JOHN A. PITTS.

Witnesses:
 A. B. STOUGHTON,
 THOMAS H. UPPERMAN.